United States Patent
Lumpkin et al.

(10) Patent No.: US 6,932,197 B2
(45) Date of Patent: Aug. 23, 2005

(54) GIMBALED PAD SUPPORT

(75) Inventors: Wayne R. Lumpkin, Littleton, CO (US); Michael T. Mayberry, Denver, CO (US)

(73) Assignee: SRAM Corporation, Chicago, IL (US)

( * ) Notice: Subject to any disclaimer, the term of this patent is extended or adjusted under 35 U.S.C. 154(b) by 0 days.

(21) Appl. No.: 10/113,683

(22) Filed: Mar. 29, 2002

(65) Prior Publication Data

US 2003/0183460 A1 Oct. 2, 2003

(51) Int. Cl.⁷ .................................. B62L 3/00
(52) U.S. Cl. .................. 188/24.22; 188/26; 188/73.31; 188/206 R
(58) Field of Search ............... 188/18 A, 26, 188/73.31, 212, 206 R, 72.7, 2 D, 24.22

(56) References Cited

U.S. PATENT DOCUMENTS

| | | | | |
|---|---|---|---|---|
| 3,589,756 A | * | 6/1971 | Pruvot | 403/124 |
| 3,890,884 A | * | 6/1975 | Siberschlag | 92/84 |
| 4,905,577 A | * | 3/1990 | Schneeweiss | 92/158 |
| 5,934,418 A | * | 8/1999 | Wirth | 188/73.1 |
| 5,950,772 A | * | 9/1999 | Buckley et al. | 188/26 |
| 5,964,321 A | | 10/1999 | Hinkens | 188/72.4 |
| 6,230,849 B1 | | 5/2001 | Lumpkin | 118/24.12 |
| 6,374,960 B1 | * | 4/2002 | Hukill et al. | 188/73.43 |

FOREIGN PATENT DOCUMENTS

| | | | |
|---|---|---|---|
| DE | 40 21 493 | * | 1/1992 |
| JP | 55-36632 | * | 3/1980 |
| JP | 8-14280 | * | 1/1996 |
| JP | 10-267058 | * | 10/1998 |
| JP | 11-30258 | * | 2/1999 |
| JP | 2002-195317 | * | 12/2000 |

* cited by examiner

Primary Examiner—Robert A. Siconolfi
Assistant Examiner—Bradley King
(74) Attorney, Agent, or Firm—Swanson & Bratschun LLC

(57) ABSTRACT

A disc brake assembly is disclosed which is attachable to the wheel supporting portion of the frame of a cycle and which allows the orientation of the planar braking surface of the brake pad assembly to be infinitely variable within a defined range The disc brake assembly consists of a disc fixedly attached to a wheel, a plurality of brake pad assemblies each having a planar braking surface facing the disc and a caliper retaining the brake pad assemblies in an operative position. When braking occurs, the caliper advances at least one of the brake pad assemblies to bring the planar braking surfaces of the brake pad assemblies into and out of contact with the disc. In addition, means is disclosed for attaching each of the brake pad assemblies to the caliper with an orientation of the planar braking surface of the brake pad assembly being infinitely variable within a defined range. Thus, the planar braking surface of each brake pad assembly is capable of being independently aligned planar parallel with a plane of orientation of the disc.

10 Claims, 5 Drawing Sheets

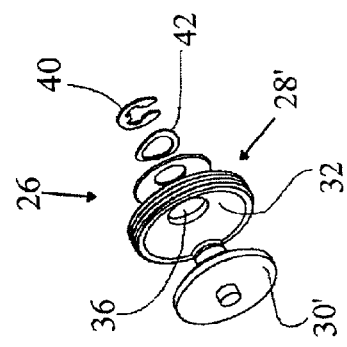
Fig. 4
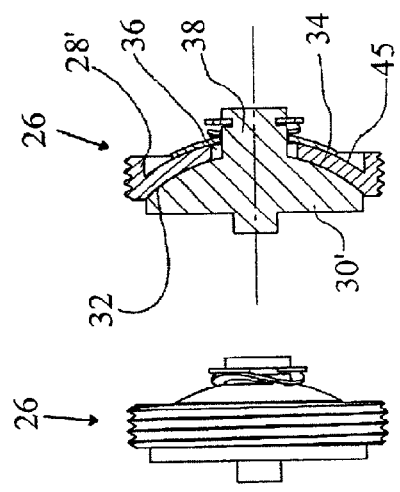
Fig. 5
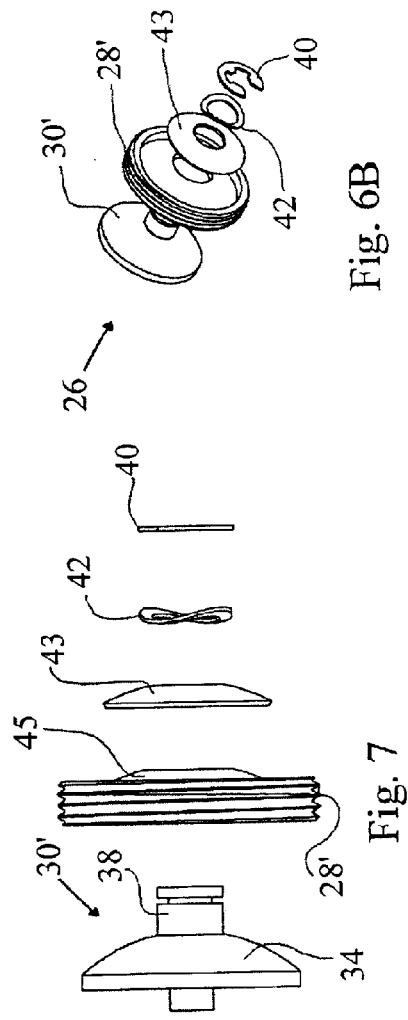
Fig. 6A
Fig. 6B
Fig. 7

GIMBALED PAD SUPPORT

TECHNICAL FIELD

The present invention is directed toward bicycle brakes, and more particularly toward a structure for adjustably attaching a disc brake pad to a disc brake caliper.

BACKGROUND ART

Disc brakes for bicycles are growing in popularity as consumers demand and bicycle manufacturers strive to provide ever advancing technology on bicycles. Disc brake systems generally consist of a disc which is fixably attached to the hub of a bicycle wheel and a caliper which is fixably attached to a wheel supporting portion of the bicycle frame and which receives the disc between a pair of brake pads which are advanced into and out of contact with the disc along a select axis. The caliper portion of the brake has some structure for attaching a pair of brake pads and securing the pads from movement parallel to the direction of the rotation of the disc as the pads are advanced into and out of contact with the disc. Over time, the brake pads will wear as a result of friction between the pad face and the disc. Therefore, the brake pad assembly must be a user replaceable item. Ideally the brake pad assembly can be replaced by the user quickly, without the use of specialized tools, under field conditions.

To ensure proper disc brake functioning, it is important to maintain a parallel planar alignment between the braking surface of a disc brake pad and the disc. In the event the parallel planar relationship between the pad surfaces and the disc is not maintained, braking efficiency will be decreased and uneven brake pad wear will be experienced resulting in a shortened brake pad useable life.

The caliper holds each brake pad so that the respective faces of each brake pad are planar parallel to each other. Therefore, structures known in the prior art which allow for the adjustment of the position of a disc brake caliper with respect to the disc can be utilized to adjust the orientation of the brake pad faces with respect to the disc. One such device is disclosed in Lumpkin, U.S. Pat. No. 6,230,849 which describes a structure and method of attaching a disc brake caliper assembly to a bicycle frame with the angle of incidence between the axis of pad operation and the plane of the disc being infinitely variable within a defined range. The prior art devices do not provide for the adjustment of the angle of the face of one brake pad independent of the angle of the face of the other. In addition, prior art devices do not allow for the orientation of the pad faces to vary during operation of the brake if the plane of the disc varies during the operation of the brake. For example, certain brakes known in the prior art, such as Buckley et. al. U.S. Pat. No. 5,950,772, provide for the application of braking force by the advancement of one brake pad into contact with a flexible disc. The advancing pad then flexes the disc into contact with a second, stationary, brake pad. This process of flexing an elastic disc into contact with a stationary brake pad involves a slight tilt of the disc from its original plane of orientation. Prior art devices which fix the alignment of the brake pads upon the original alignment of the disc cannot compensate for the misalignment which results from a change in the plane of the disc during normal brake operation.

The present invention is directed toward overcoming one or more of the limitations discussed above.

SUMMARY OF THE INVENTION

The present invention is an attachment structure for a brake pad assembly. The brake pad assembly is a component of a disc brake system attachable to the wheel supporting portion of the frame of a bicycle. In addition to the brake pad assembly, the disc brake system consists of a disc attached to a bicycle wheel, and a caliper retaining the brake pad assembly in an operative position. The disc is received between the brake pad assembly and a second brake pad assembly. In operation the caliper advances at least one of the brake pad assemblies to bring the braking surface of the brake pad assemblies into and out of contact with the disc. The brake pad assembly is attached to the caliper such that the orientation of the planar braking surface of the brake pad assembly is infinitely variable within a defined range whereby the planar braking surface of the brake pad assembly is alignable planar parallel with the fixed or variable plane of orientation of the disc. The variation in the orientation of the pad face of the brake pad assembly can be implemented by a gimbaled attachment device.

The gimbaled attachment of a brake pad assembly to the caliper can be accomplished in one embodiment of the present invention with the following structural elements: a brake pad assembly is attached to a pressure foot, the pressure foot is attached to a pad wear adjusting element, finally, the pad wear adjusting element is attached to the caliper.

The contact surfaces between the pad wear adjusting element and the pressure foot are constructed so that each element has one of a mating concave or convex surface. Either the pressure foot or the pad wear adjusting element has an attachment post which extends through a hole in the other element and which is secured by a clip. The diameter of the hole is somewhat larger than the diameter of the attachment post. Therefore, infinitely variable gimbaled motion is allowed within a defined range across the mating concave and convex surfaces of the pressure foot and the pad wear adjusting element. This in turn allows the orientation of the planar braking surface of the brake pad assembly to be infinitely variable within a defined range with respect to the plane of orientation of the disc.

In another aspect, gimbaled attachment of the brake pad assembly to the caliper can be accomplished with the following structural elements: a caliper piston, a gimbaling member and a brake pad assembly attached to the gimbaling member. In this aspect, the contact surfaces between the caliper piston and the gimbaling member are a semi-ball surface and a semi-ball socket. A snug fit between the gimbaling member and the caliper piston is maintained by an elastomeric o-ring which fits between an inner surface of the caliper piston and an outer surface of the gimbaling member. Infinitely variable gimbaled motion is allowed within a defined range through the semi-ball and socket joint. This allows the orientation of the planar braking surface of the brake pad assembly to be infinitely variable within a defined range with respect to the plane of orientation of the disc.

BRIEF DESCRIPTION OF THE DRAWINGS

FIG. 4 is a side elevation view of a gimbaled attachment structure of the present invention;

FIG. 5 is a cross-section of the gimbaled attachment structure of FIG. 4;

FIGS. 6A and 6B are exploded views of the gimbaled attachment structure of FIG. 4 from perspectives off-set 90°;

FIG. 7 is a side exploded view of the gimbaled attachment structure of FIG. 4;

DETAILED DESCRIPTION OF THE PREFERRED EMBODIMENT

Figure 1:
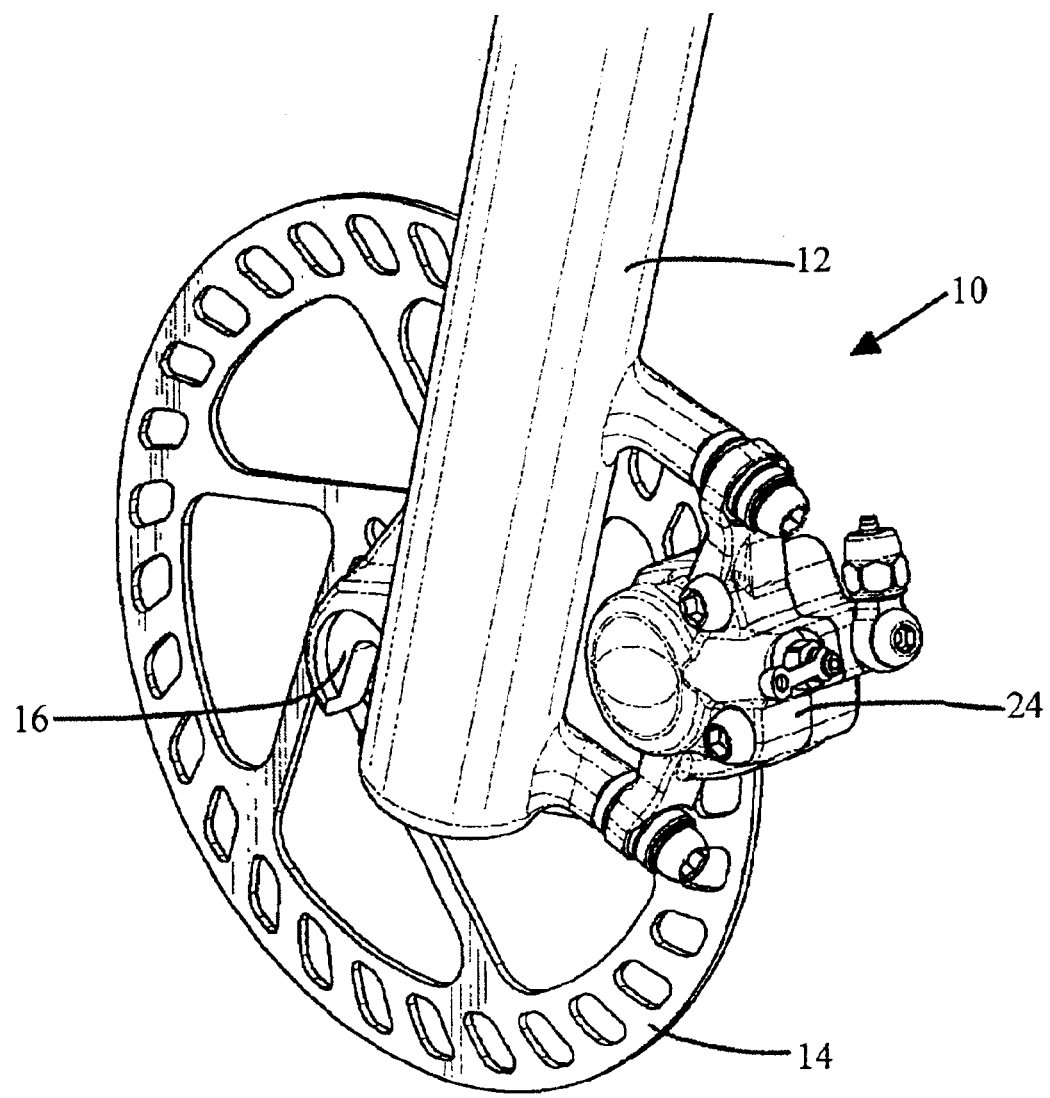
FIG. 1 is a perspective view of a disc brake assembly including a caliper assembly mounted on a bicycle frame.

A disc brake assembly 10 is attached to a wheel supporting portion of a bicycle frame 12 which is represented as a front fork of a bicycle in FIG. 1. The disc brake assembly consists of a disc 14 which is fixably attached to a hub of a wheel for rotation with the wheel hub. The wheel hub is attached to the bracket 16 of the wheel supporting portion of a bicycle frame 12. The wheel and hub are omitted from FIG. 2 for the sake of clarity. The disc 14 can be maintained in a fixed plane of orientation relative to the wheel, or it can flex through an arc as braking pressure is applied.

Figure 2:
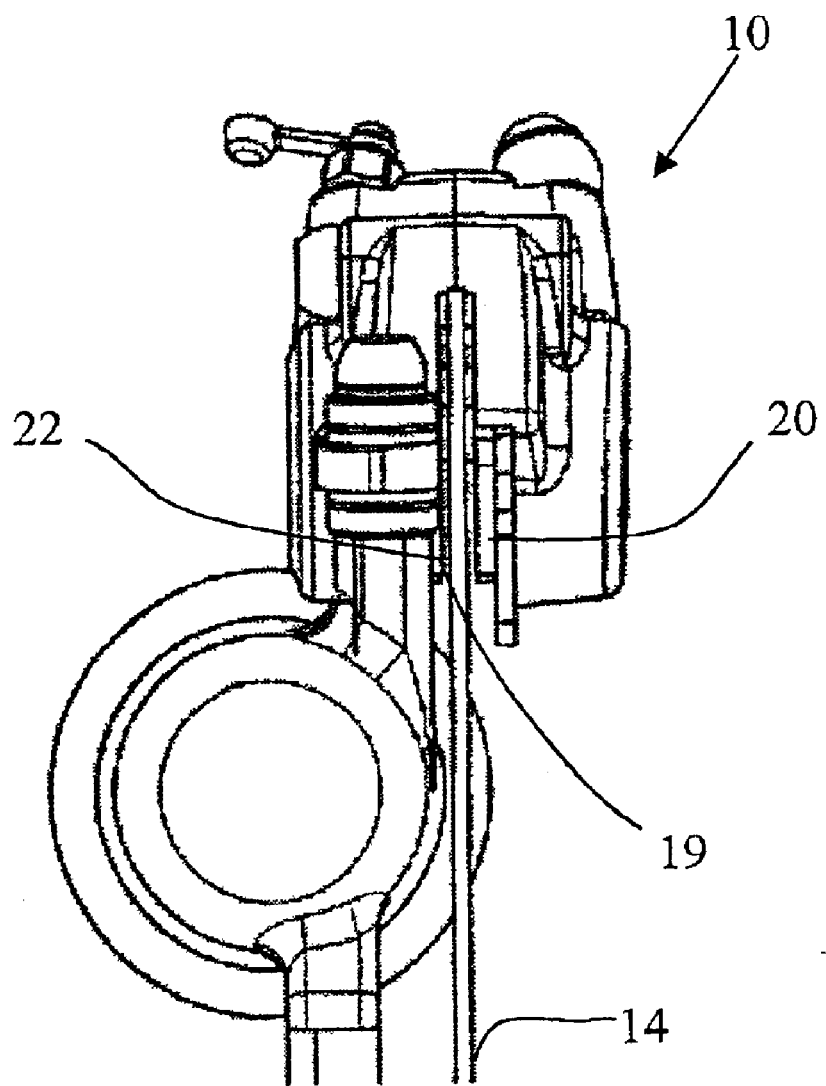
FIG. 2 is a bottom view of the caliper assembly shown in FIG. 1 showing the disc received between opposing brake pads.
Figure 3:
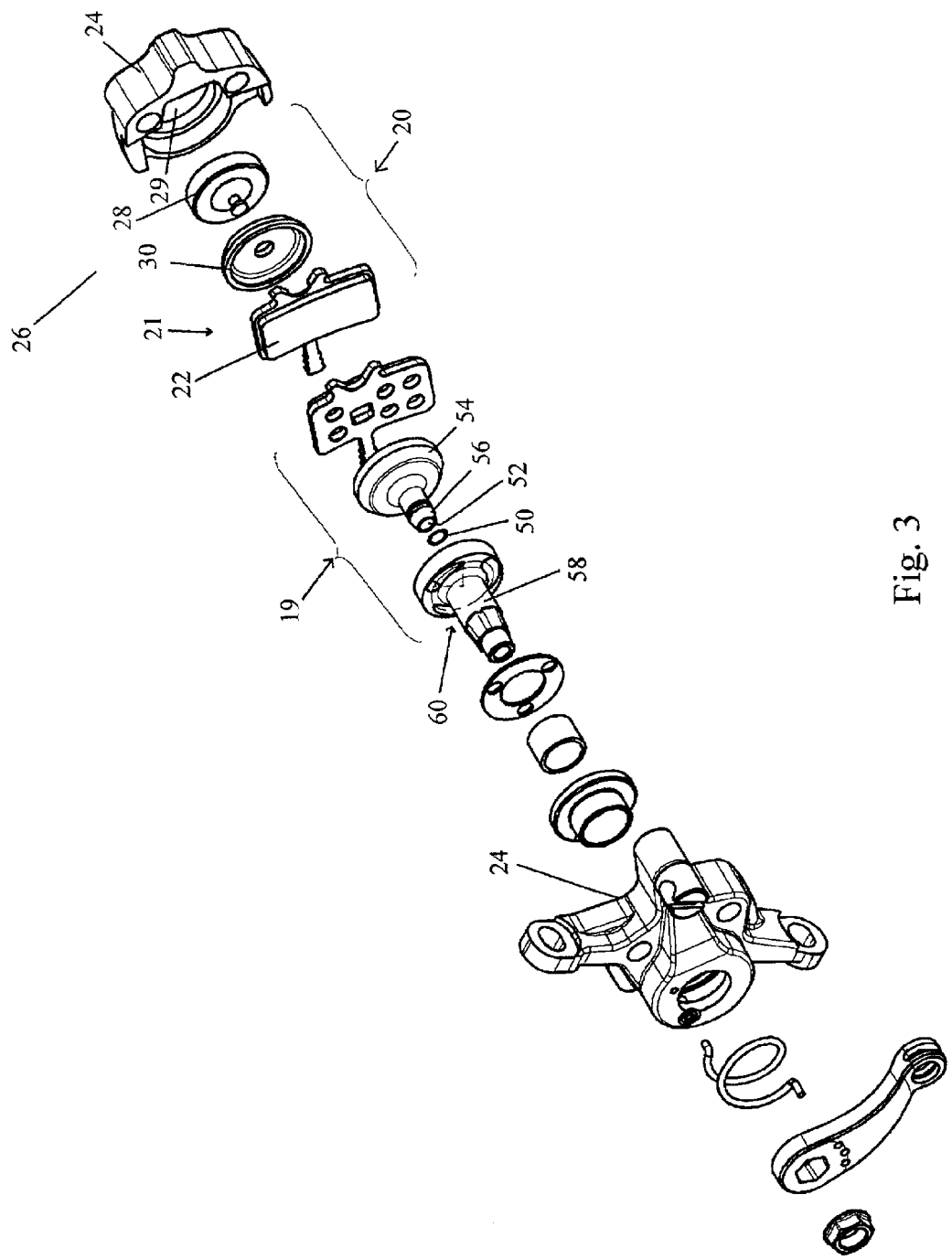
FIG. 3 is an exploded view of the caliper assembly of FIG. 1.
Figure 8A:
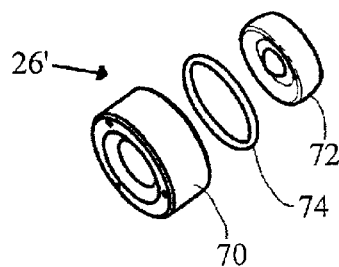
FIGS. 8A and 8B are exploded views of an alternative embodiment of the gimbaled attachment structure from perspectives off-set 90°.
Figure 8B:
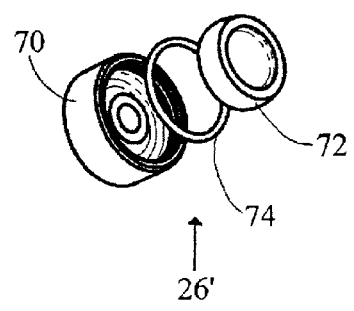

The disc 14 is received between a pair of brake pad assemblies 19 and 20, as illustrated in FIG. 2. FIG. 3 is an exploded view of a conventional caliper described in greater detail in U.S. Pat. No. 6,230,849 featuring a gimbaled structure 26 of the present invention on one brake pad assembly 20. As seen in FIG. 3, the brake pad assemblies 19 and 20 include a pad 21 having a planar braking surface 22. The brake pad assembly 20 further includes a pad wear adjusting element 28 and pressure foot 30. The pad wear adjusting element 28 threadably engages the cavity 29 of the caliper 24. The caliper 24 moves one or both brake pad assemblies 19, 20 into and out of contact with the disc 14 during the operation of the disc brake assembly 10.

Ideally, the caliper 24 is attached to the wheel supporting portion of the bicycle frame 12 such that the planar braking surfaces 22 of the brake pad assemblies 19, 20 are oriented planar parallel to the plane of orientation of the disc 14. However, adjustment of the orientation of the caliper 24 cannot provide for independent adjustment of the planar braking surface 22 of each of the brake pad assemblies 19, 20. In addition, the plane of orientation of the disc may change during the braking process as a result of the intentional or unintentional flexing of the disc 14 as braking pressure is applied.

FIG. 4 is a side elevational view of a gimbaled attachment structure 26 between a brake pad assembly 20 and the caliper 24 that allows for infinite variation of the orientation of the planar braking surface 22 with respect to the plane of orientation of the disc 14 within a defined range. Thus, the planar braking surface 22 of each brake pad assembly 19, 20 is always capable of being aligned planar parallel with the plane of orientation of the disc.

Referring to the cross-section of FIG. 5, the gimbaled attachment structure 26 consists of pad wear adjusting element 28' which threadably engages the caliper 24, in the same manner as the pad wear adjusting element 28 illustrated in FIG. 3. Attached to the pad wear adjusting element 28' is a pressure foot 30'. The pad 21 is attached to the side of the pressure foot 30' opposite the attachment of the pad wear adjusting element 28', with planar braking surface 22 exposed.

In the preferred implementation of the first embodiment, the surface of the pad wear adjusting element 28' where it contacts the pressure foot 30' is formed into a concavity 32. A hole 36 is formed through the pad wear adjusting element 28' and centered in the concave surface 32. The pressure foot 30' is formed with a convex surface 34 on the side which is adjacent to the pad wear adjusting element 28'. The convex surface 34 of the pressure foot 30' mates with the concave surface 32 formed in the pad wear adjusting element 28'. Extending from the center of the convex surface 34 of the pressure foot 30 is an attachment post 38. When assembled, the attachment post 38 of the pressure foot 30' extends through the hole 36 in the pad wear adjusting element 28' and is secured with a clip 40. The pad wear adjusting element 28' and pressure foot 30' are preferably biased into contact with a wave washer 42. A convex washer 43 which resides between the convex surface 45 of the adjusting element 28 and the wave washer 42 is also preferably provided. The convex washer 43 facilitates smooth gimbaling of the pressure foot 30' relative to the adjusting element 28'.

In an alternative embodiment, the concave surface 32 and hole 36 are formed on the pressure foot 30. Accordingly, the convex surface 34 and attachment post 38 are formed on the pad wear adjusting element 28.

In either embodiment the diameter of the hole 36 is somewhat larger than the diameter of the attachment post 38. Therefore, gimbaled movement across and around the concave surface 32 and convex surface 34 is possible. The gimbaled movement between the pressure foot 30 and the pad wear adjusting element 38 allows infinite variation of the orientation of the planar braking surface 22 of the brake pad assemblies 19, 20 with respect to the plane of orientation of the disc 14 within a fixed range of movement.

Another embodiment of the brake pad assembly 20 is shown in FIGS. 8A, 8B, 9, 10 and 11. In this embodiment, the brake pad assembly 20 includes a gimbaled attachment structure 26' which includes a pad 21 having a planar braking surface 22. The gimbaled attachment structure 26' further includes a gimbaling member 72 and an actuating member such as a caliper piston 70. The caliper piston 70 is a slave piston and is mounted in the caliper 24. In this embodiment, the surface of the caliper piston 70 where it contacts the gimbaling member 72 is formed into a semi-ball socket 82. The corresponding surface of the gimbaling member 72, where it contacts the caliper piston 70 is formed into a mating semi-ball surface 84. The gimbaling member is free to gimbal about the semi-ball surface 84 and semi-ball socket 82 attachment point such that an infinite variation in the orientation of the planar braking surface 22 with respect to the plane of the orientation of the disc 14 within a defined range is available. The caliper piston 70 and the gimbaling member 72 can be held together as a unit by an o-ring 74 which fits around an outer surface 76 of the gimbaling member 72 and which fits into a notch 80 in an inner surface 78 of the caliper piston 70. The o-ring may be an elastomer or a split resilient ring or any other suitable retaining ring.

Figures 9, 10, 11:
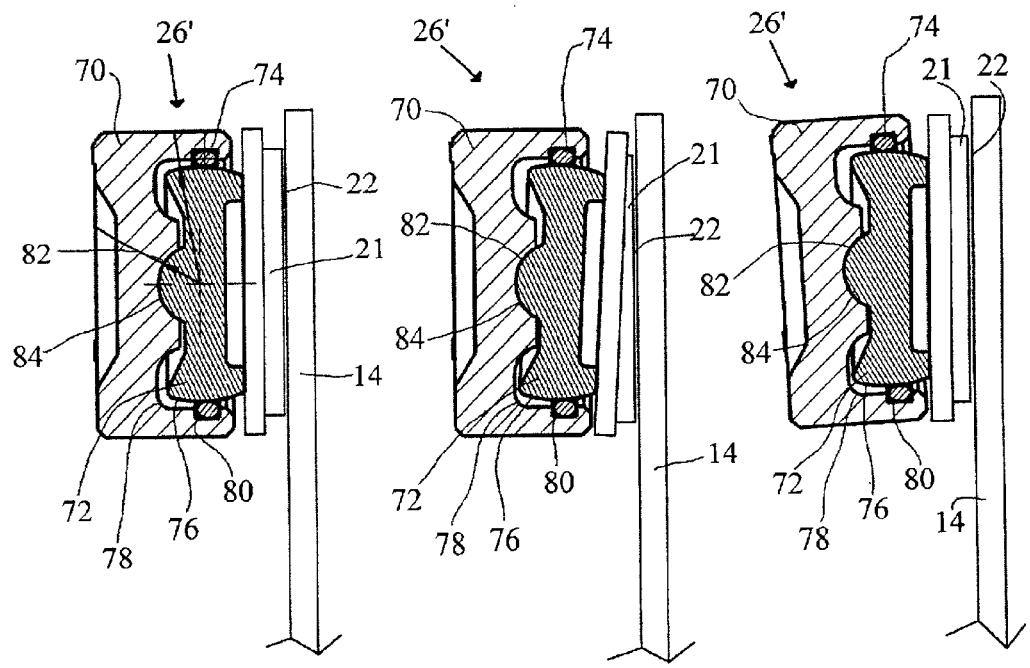
FIG. 9 is a cross-section of the gimbaled attachment structure of FIGS. 8A and 8B where the caliper is properly aligned to the disc and no gimbaling is necessary to maintain proper brake pad alignment.
FIG. 10 is a cross section of the gimbaled attachment structure of FIGS. 8A and 8B where gimbaling has occurred to correct an alignment problem caused by uneven brake pad wear.
FIG. 11 is a cross-section of the gimbaled attachment structure of FIGS. 8A and 8B where gimbaling has occurred to compensate for misalignment of the caliper.

FIGS. 9–11 illustrate the use of the gimbaled attachment structure 26' in maintaining the alignment of the planar braking surface 22 with the plane defined by the disc 14. In particular, FIG. 9 shows a system where the caliper piston 70 is properly aligned with the disc 14 and no gimbaling is necessary to maintain the proper orientation of the planar braking surface 22. On the contrary, FIG. 10 shows a system where the upper portion of the pad 21 has worn more than the bottom portion of the pad 21. A slight angular rotation of the gimbaling member 72 allows the planar braking surface 22 to maintain its proper orientation without the need to adjust the angle of the caliper piston 70 or the caliper 24. The o-ring 74 maintains the proper orientation of the planar braking surface 22 by securing the gimbaling member 72 in a snug but movable fit with the caliper piston 70. Similarly, FIG. 11 shows a system where the caliper 24 and the attached caliper piston 70 are out of alignment with the disc 14. Angular rotation of the gimbaling member 72 allows for proper orientation of the pad provided the caliper 24 is not so far out of alignment that the range of gimbaling motion is exceeded.

Although not shown, a similar structure could be provided to allow for gimbaling of the opposite pad assembly 19, on either a fixed portion of a caliper or an opposing caliper piston. Or, as shown in FIG. 3, an alternative structure can be provided for gimbaling of the opposite pad, such as a ball bearing 50 received in a cup 52 of pressure foot 54 which allows for gimbaling of the pressure foot shaft 56 within the hollow shaft 58 of the drive element 60.

The gimbaled pad support of the present invention allows the planar braking surfaces 22 of the brake pad assemblies 19, 20 to be independently adjusted the plane of orientation of the disc 14. This adjustment can occur independently from the positioning and orientation of the caliper 24. In addition, the gimbaled attachment structure 26 allows for dynamic adjustment of the orientation of the planar braking surface 22 if the plane of orientation of the disc 14 changes during the braking process. As a result braking efficiency can be maximized by assuring that the planar braking surfaces 22 are brought into full flush contact with the disc 14 at all times during braking. In addition, undesired rubbing between the planar braking surfaces 22 and the disc 14 can be minimized. This increases brake pad life and assures maximum braking efficiency.

What is claimed is:

1. A gimbaling member operatively disposed between a disc brake caliper and a brake pad assembly comprising:
   a semi-spherical outer surface received within a cylindrical inner surface operatively associated with the disk brake caliper;
   a ring operatively disposed between the semi-spherical outer surface and the cylindrical inner surface;
   a planar braking surface operatively associated with the gimbaling member, whereby the ring and the semi-spherical outer surface in combination maintain the orientation of the planar braking surface after gimbaled variation in the orientation of the planar braking surface; and
   a semi-ball surface in contact with a thrust surface, one of the semi-ball surface and the thrust surface operatively associated with the gimbaling member and the other one of the semi-ball surface and the thrust surface operatively associated with the disc brake caliper.

2. The gimbaling member of claim 1 wherein the disc brake caliper further comprises a piston, the piston defining the cylindrical inner surface and the thrust surface.

3. The gimbaling member of claim 1 wherein the ring is an elastomeric o-ring.

4. The gimbaling member of claim 1 wherein the semi-ball surface has a semi-spherical shape and is concentric with the semi-spherical outer surface.

5. The gimbaling member of claim 4 wherein the thrust surface has a semi-spherical shape substantially mating with the semi-ball surface.

6. A disc brake caliper comprising:
   a caliper housing configured for attachment to a bicycle frame in operative association with a disc attached to a wheel rotatably mounted to the bicycle frame;
   a pair of brake pad assemblies within the caliper housing, each brake pad assembly having a planar braking surface, the brake pad assemblies being configured within the caliper housing to receive the disc between the planar braking surfaces;
   a drive mechanism for advancing at least one of the brake pad assemblies to bring the planar braking surface associated therewith into and out of contact with the disc;
   a gimbaling member operatively associated with at least one of the brake pad assemblies allowing orientation of the planar braking surface of the at least one brake pad assembly to be variable without restriction within a defined range, the gimbaling member comprising a semi-spherical outer surface operatively associated with the caliper housing and a ring operatively disposed between the caliper housing and the semi-spherical outer surface; and
   a semi-ball surface in contact with a thrust surface, one of the semi-ball surface and the thrust surface operatively associated with the gimbaling member and the other one of the semi-ball surface and the thrust surface operatively associated with the caliper housing.

7. The disc brake caliper of claim 6 wherein the drive mechanism comprises a piston, the piston defining a cylindrical inner surface receiving the semi-spherical outer surface.

8. The disc brake caliper of claim 6 wherein the ring is an elastomeric o-ring.

9. The disc brake caliper of claim 6 wherein the semi ball surface has a semi-spherical shape which is concentric with the semi-spherical outer surface.

10. The disc brake caliper of claim 9 wherein the thrust surface has a semi-spherical shape substantially mating with the semi-ball surface.

* * * * *